INVENTOR
George E. Sanner

BY Strauch, Nolan, Neale,
Nies and Bronaugh
ATTORNEYS

March 17, 1970  G. E. SANNER  3,500,844
CONTROLS FOR LAWN SPRINKLING SYSTEMS AND THE LIKE
Filed May 18, 1965  3 Sheets-Sheet 2

INVENTOR
George E. Sanner

BY Strauch, Nolan, Neale,
Nies and Bronaugh
ATTORNEYS

INVENTOR
George E. Sanner

BY Strauch, Nolan, Neale,
Nies & Bronaugh
ATTORNEY

{ # United States Patent Office 3,500,844
Patented Mar. 17, 1970

3,500,844
CONTROLS FOR LAWN SPRINKLING SYSTEMS
AND THE LIKE
George E. Sanner, Cypress Hill, Sparks, Md. 21152
Filed May 18, 1965, Ser. No. 456,787
Int. Cl. A01g 25/00; F16k 17/36, 21/18
U.S. Cl. 137—78                                    8 Claims

ABSTRACT OF THE DISCLOSURE

A lawn sprinkling system or the like including at least one solenoid actuated flow valve for controlling the flow of water to a sprinkling device, timer mechanism for regulating the operation of said valve and the flow of water therethrough, and an override arrangement for effecting the closing of said valve during periods of actual rainfall and for automatically restoring the operation of the valve to the control of the timer mechanism when the rainfall ceases.

---

This invention relates to control systems and, primarily, to systems for automatically controlling the operation of lawn sprinklers although the invention disclosed herein may be used for other purposes as well.

Numerous automatically controlled lawn sprinkler systems have heretofore been proposed. A major disadvantage of many of these is that no provision is made for turning off the sprinklers during periods of natural rainfall. Consequently, such systems waste water and, in addition, may overwater and damage the grass in lawns in which they are employed.

This problem has heretofore been recognized, and several attempts have been made to solve it as is shown by U.S. Patents Nos. 2,284,158, 2,318,969, 3,063,643, and 3,140,720, all of which disclose automatic controlled lawn sprinkling systems in which provision is made for shutting off the sprinklers when it begins to rain. However, the systems of this type heretofore known have a number of disadvantages. First, they employ a mechanical arrangement such as a float-operated switch for shutting off the sprinklers, which is complex, expensive, bulky, and less reliable, and more difficult to adjust than is desirable. Second, these prior systems have an undesirably long reaction time. Third, some of the prior art systems must be manually reset after the rain ceases by draining a rain collecting container. In the others, resetting of the system involves the evaporation of collected moisture from a container, which takes an undesirably long period of time.

It is an important object of the present invention to provide novel, improved automatic lawn sprinkler systems which are capable of shutting off the sprinklers during periods of natural rainfall, but do not have the above-enumerated disadvantages of previously known systems of this type.

In general, the novel lawn sprinkling systems provided by the present invention are characterized by one or more electromagnetically controlled valves in series with an electric timer-operated switch and a non-resistive rain-operated switch. The timer is set for a given interval of time depending upon the locality, annual rainfall, type of vegetation being irrigated, etc. At a given time within each 24 or 48 hour interval, the timer closes the timer-operated switch, the electromagnetic valve (or valves) opens, and sprinkling occurs. However, if natural rainfall occurs while the flow control valve is open, the rain switch closes; and sprinkling ceases while the natural rainfall continues.

If the natural rainfall continues beyond the end of the preset increment of time, the sprinkler does not resume operation until the 24 or 48 hour period has elapsed. However, if the natural rainfall ends before completion of the preset time increment, the rain switch opens; and sprinkling is resumed. In this manner lawns may be provided with automatic irrigation for a preselected portion of each 24 or 48 hour period, the irrigation consisting of artificial rainfall or natural rainfall, or a combination of both.

The rain switch employed in the systems just described consists of an insulating base on which two sets of spaced apart conductive members are fixed. Rain impinging on the base closes the switch by completing a circuit between the conductive members.

As the rain switch just described has no moving parts, is assembled from a small number of inexpensive and easily assembled parts, and does not employ rain collecting containers or other bulky components, the sprinkler control units of the present invention are economic to manufacture, compact, reliable, and rugged.

Also, the systems of the present invention have a much faster reaction time than those heretofore known, both at the beginning and end of a rain because less rainfall is required to close the rain switch and the small amount of water that does collect on it will evaporate very quickly when the rain stops. In addition the systems of the present invention are extremely simple and can be easily and quickly installed by the homeowner. A further advantage of the systems disclosed herein is that the control units can readily be employed to control auxiliary units such as rain alarms, booster pumps, and the like.

From the foregoing, it will be apparent that further important objects of the present invention include the provision of novel automatic lawn sprinkling systems of the type hereinbefore described, which:

(1) Are simpler, more compact, more reliable, and less expensive to manufacture than those heretofore known;

(2) Have faster reaction times and are more versatile than the prior art systems of this type;

(3) Do not require adjustment;

(4) Are completely automatic;

(5) In conjunction with the foregoing objects, employ a rain switch which is completely devoid of moving parts and does not employ rain collecting containers as used in the prior art systems; and (6) Include control units which are readily adapted to other applications requiring a combination of time control and control by natural rainfall.

Yet another important object of this invention is the provision of novel improved systems which are readily adaptable to the control of flow and/or pump operation in response to time and one or more other parameters such as precipitation, pressure, humidity, water level, and the like.

Additional objects, further novel features, and other advantages of the present invention will become more fully apparent from the appended claims and from the ensuing detailed description and discussion of the present invention as it proceeds in conjunction with the accompanying drawing, in which:

Figure 1:
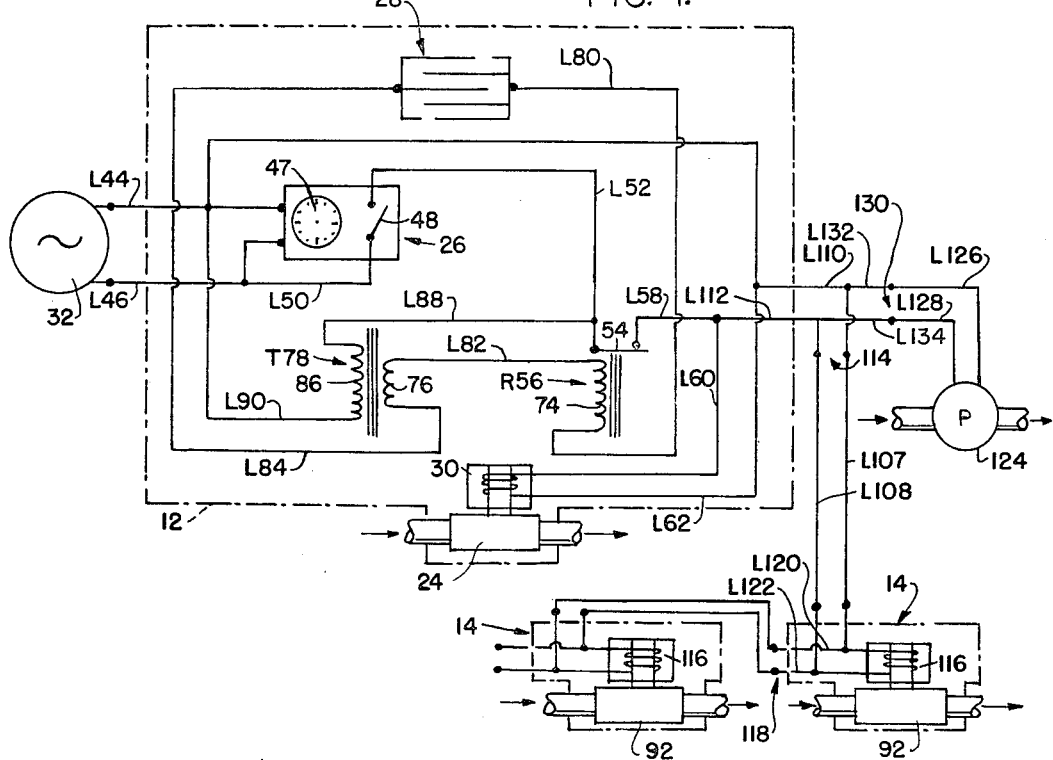
FIGURE 1 is a schematic diagram of a law sprinkling system constructed in accord with the principles of the present invention.
Figure 2:
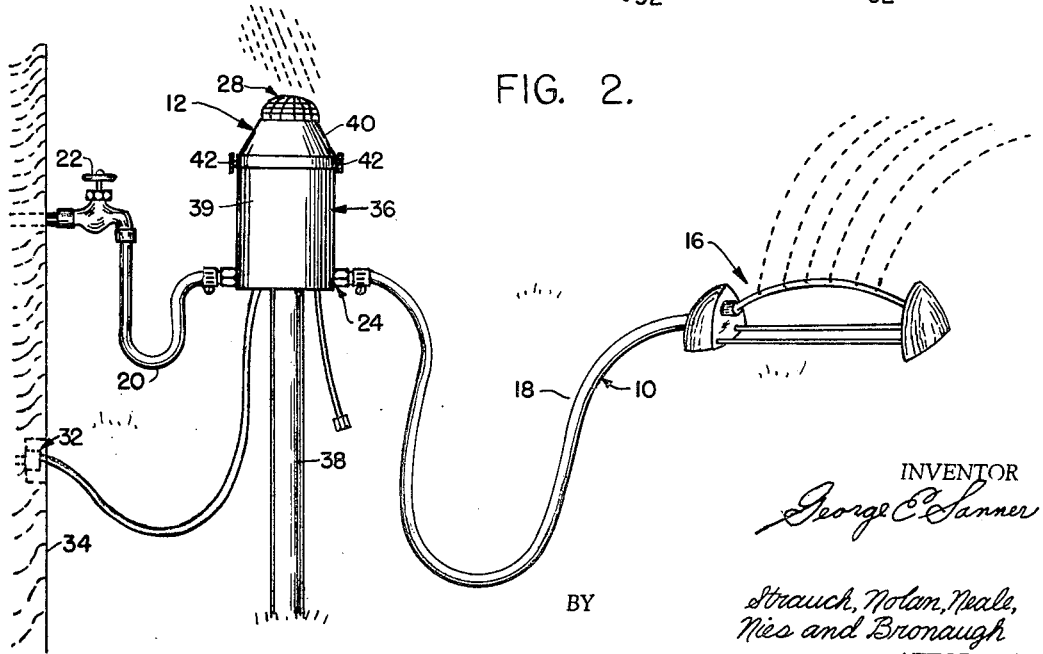
FIGURE 2 is an elevation of a master control unit employed in the system of FIGURE 1.
Figure 3:
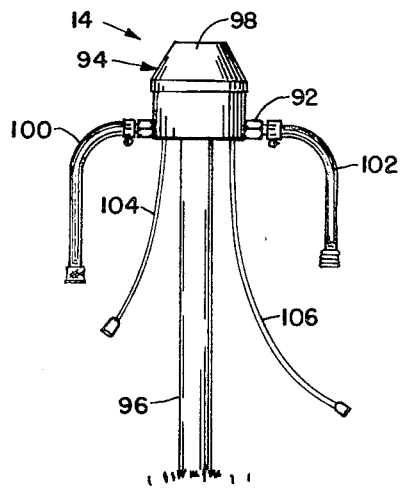
FIGURE 3 is an elevation of a remote unit which may be employed in the system of FIGURE 1.

Referring now to the drawing and, more specifically, to FIGURES 1–3, automatic lawn sprinkling systems constructed in accord with the principles of the present invention include a conventional water distribution system 10 and a master flow control unit 12 and may include one or more remote control units 14 for controlling the flow of water through distribution system 10.

Referring now specifically to FIGURE 2, water distribution system 10 typically includes at least one sprinkler 16, which may be of any desired construction, connected by flexible conduits 18 and 20 to a faucet 22 or other source of water under pressure. Connected between flexible conduits 18 and 20 is an electromagnetically actuated valve 24 for controlling the flow of water from faucet 22 to sprinkler 16.

It is the function of master control unit 12 to control the flow of water to sprinkler 10 by opening and closing valve 24. As best shown in FIGURE 1, the major components of the master control unit are a timer 26 and a rain switch 28, both of which are electrically connected to the electromagnetic actuator or solenoid 30 of valve 24 and to a source of A.C. voltage identified generally by reference character 32. As shown in FIGURE 2, this source may be an outlet on an exterior building wall 34.

As shown in FIGURE 2, the components of master control unit 12 just described together with valve 24 are housed in a casing 36 mounted above ground level on a stanchion 38. Casing 36 includes a lower cylindrical member 39 to which a frustoconical upper member 40 is detachably fixed by fasteners 42. Mounted on the upper end of casing member 40 is the rain switch 28 referred to previously.

Referring again to FIGURE 1, the voltage present at source 32 (typically, ordinary 110–120 volt, 60 cycle, A.C. house voltage) is applied through conductors L44 and L46 to the terminals of timer 26, which may be of the conventional type including a 24 or 48 hour clock 47 provided with trips (not shown) adapted to open and close a timer switch 48 one or more times during each 24 or 48 hour period. With timer switch 48 closed, operating voltage is applied from source 32 through leads L46 and L50, the timer switch, lead L52, the normally closed contact 54 of relay R56, and leads L58 and L60 to one side of the coil of the electromagnetic actuator 30 of valve 24. The opposite side of solenoid 30 is connected by leads L62 and L44 to voltage source 32.

Therefore, when timer switch 48 closes, actuator 30 is connected across voltage source 32, energizing the actuator and opening valve 24, which permits water to flow from faucet 22 through conduit 20, valve 24, and conduit 18 into sprinkler 16. Consequently, as long as timer switch 48 remains closed, sprinkling will occur. By adjusting the timer trips, the duration of this period and the time at which it starts can be adjusted. Since the manner in which this is done is well known and as a number of suitable timers are commercially available, a detailed description of timer 26 is not believed necessary herein.

It is the function of rain switch 28 to modify the timer operation just described in such a manner that, during periods of natural rainfall, the continuity of the circuits to actuator 30 will be interrupted and valve 24 closed, even though timer switch 48 may be closed to complete the actuator energizing circuit described above.

Figure 4:
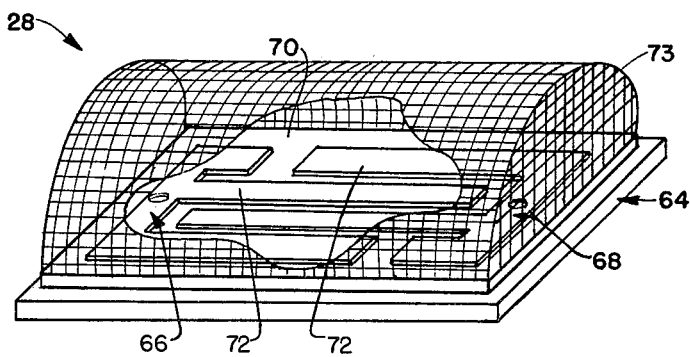
FIGURE 4 is a perspective view of a rain switch employed in the system of FIGURE 1 and incorporated in the master control unit illustrated in FIGURE 2.

Referring now to FIGURE 4, rain switch 28 includes an insulating base 64 with two contacts 66 and 68 fixed to its upper surface 70. Contacts 66 and 68 are fabricated of conductive metal and have a series of interleaved fingers 72 which are relatively widely spaced to prevent dew or humid air from making a connection between fingers of the two contacts. However, the fingers are so spaced that, during periods of actual rainfall, the moisture accumulating on the upper surface 70 of base 64 will bridge adjacent fingers 72 and close rain switch 28 by electrically connecting contact 66 to contact 68. Typically, the minimum distance between fingers 72 will be 0.032 inch.

Fixed to base 64 above contacts 66 and 68 is a rain diffuser shield 73 fabricated of open mesh material. Shield 73 converts the drops of water impinging on it to a fine spray which covers contact fingers 72 and the spaces between them to provide a conductive path between contacts 66 and 68. Shield 73 is also a safety device, preventing inadvertent contact with contacts 66 and 68.

The operation of rain switch 28 can best be understood by reference to FIGURE 1 from which it can be seen that the rain switch is connected in series with the coil 74 of relay R56 (which, as mentioned previously, has a normally closed contact 54 in the actuator energizing circuit of valve actuator 24) and the secondary winding 76 of a stepdown transformer T78 by leads L80, L82, and L84. The primary winding 86 of transformer T78 is connected by lead L46, timer switch 48, and leads L52, L88, L90, and L44 across the source of alternating current 32. Thus, operating voltage appears across the rain switch when timer switch 48 is closed (i.e., during watering periods) and is removed from the switch when timer switch 54 is open. This minimizes the shock hazard at the rain switch.

From the foregoing it will be apparent that, when rain falls and closes rain switch 28, a relay energizing circuit is completed from transformer secondary 76 through lead L82, the relay coil 74, lead L80, rain switch 28, and lead L84 back to the transformer secondary. Completion of this circuit and the energization of relay coil 74 opens normally closed relay contact 54. This interrupts the continuity between leads L52 and L58 in the circuit provided to energize actuator 30 of valve 24, de-energizing the actuator. Consequently, valve 24 closes, interrupting the flow of water to sprinkler 16.

The relay energizing circuit just described will remain completed as long as the rain continues, and no water will be supplied to sprinkler 16 while it is raining. However, as soon as the rain stops, the small amount of moisture remaining on the upper surface 70 of rain switch base 64 will quickly evaporate, opening the rain switch by interrupting the continuity of the circuit between the fingers 72 of contacts 66 and 68. This interrupts the continuity between leads L80 and L84 of the relay energizing circuit, de-energizing relay R56 and returning its contact 54 to the normally closed position to restore continuity between leads L52 and L58 of the valve actuator energizing circuit.

If this occurs before the end of the watering period set into timer 26, timer switch 48 will still be closed; operating voltage will again be applied to actuator 30 through the circuit described above; valve 24 will open; and sprinkling will be resumed, terminating at the end of the preselected period. However, if the rain does not cease until after the end of the preselected period, the timer will run its course and open timer switch 48. Consequently, the subsequent opening of rain switch 28 will not energize actuator 30; and valve 24 will remain closed until the next watering period.

There are a number of important advantages to the control circuit just described. Specifically, because of the novel construction described above, rain switch 28 has an extremely fast reaction time; and it will close almost simultaneously with the beginning of a rain. Similarly, since only an extremely small amount of moisture collects on the rain switch base, which has a relatively large area, evaporation is very rapid when the rain stops; and, therefore, sprinkling will be resumed substantially conterminously with the cessation of the rain.

Another important feature of the arrangement just described is the use of stepdown transformer T78 and sensitive relay R56 in series with rain switch 28 to control the continuity of the circuit to valve actuator 30. As rain switch 28 must be exposed to the atmosphere in order to operate effectively, safety considerations dictate that the operating voltage and flow of current be maintained as low as possible. Consequently, a transformer T78 is employed which will provide maximum coil resistance and minimum voltage and current in secondary 76 (shock hazard may also be reduced by making conduit 22 electrically conductive, which will absolutely ground master control unit 12). In addition to minimizing electrical shock hazards from the exposed rain switch, this arrangement is also effective to prevent excitation transients across rain switch 28 due to collapsing magnetic fields in the coil of relay R56 and in the coil of actuator 30 of valve 24. Typically, transformer T78 will have a turns ratio of from 10:1 to 20:1 with resistance optimized for minimum current flow. This particular arrangement is, however, not critical and will vary depending upon the electrical characteristics of the rest of the circuit components.

Another important feature of the novel master control unit 12 just described is that it may be employed to control additional sprinklers 16 by utilizing the remote control units 14 mentioned above and illustrated in FIGURE 3. Turning now to the latter figure, each remote control unit 14 includes an electrically actuated valve 92 housed in a casing 94, which is supported above ground level by a stanchion 96 or other suitable support (for example, casing 94 can be attached directly to faucet 22). Extending from casing 94 (which may be provided with a removable cover 98 to allow access to its interior) are flexible conduits 100 and 102, connected to the inlet and outlet of valve 92, and electrical cables 104 and 106. Conduits 100 and 102 are intended to be connected to a source of water and to a sprinkler, respectively.

Referring now to both FIGURES 1 and 2, cable 104 includes leads L107 and L108 which are adapted to be connected to master control unit leads L110 and L112 at terminals 114 as by a conventional plug-in type connector. As shown in FIGURE 1, leads L110 and L112 are connected in parallel to the leads L60 and L62 connecting the actuator of valve 24 to voltage source 32. Consequently, leads L107–L110 connect the electromagnetic actuator 116 of valve 92 in parallel with the actuator 30 of valve 24 so that the two valves are opened and closed concurrently.

As is also shown in FIGURE 1, additional remote control units may be added to the system by connecting the cable 106 of the first remote control unit to the cable 104 of a second remote control unit 14 at a terminal 118 which, again, may be of the conventional plug-in type. As shown in FIGURE 1, remote control unit cable 106 includes leads L120 and L122, which are connected in parallel with the leads L107 and L108 of remote control unit cable 104. Consequently, by connecting together the cable 106 of a first unit 14 and the cable 104 of a second unit 14, the actuators 116 of the two units 14 may be energized and de-energized simultaneously, causing the valves of the two units to open and close together. Additional remote control units 14 may similarly be connected to the system, depending upon the design capacity of the master control unit. Typically, a home lawn (a lawn of up to 40,000 square feet) may be adequately covered by a master unit 12 and one to three remote control units 14.

A further feature of master control unit 12 is that it may also be employed to actuate other electrically operated devices such as conventional rain warning alarms, booster pumps, liquid fertilizer distributing devices, and the like. For example, FIGURE 1 illustrates a booster pump 124, which may be mounted on the stanchion 96 of a remote control unit 14 or the stanchion 38 of master control unit 12. The motor of pump 124 is connected by leads L126 and L128 through a connector 130, which may be of the plug-in type, to master control unit leads L132 and L134. The latter leads are connected to master control unit leads L110 and L112 which, as mentioned previously, are connected in parallel to the actuator 30 of valve 24. Consequently, operating voltage will be applied to the pump motor at the same time that it is applied to actuator 30, co-ordinating the operation of pump 124 with the opening and closing of valve 24.

By coupling an electrically operated fertilizer distributing device to the master control unit in the manner just described in conjunction with pump 124, the operation of such device can, of course, also be co-ordinated with the opening and closing of valve 24 and the application of water to the lawn through sprinkler 16. By substituting an SPDT relay for relay R56 and wiring a conventional rain alarm across one set of the relay contacts, the alarm can be activated by the closing of rain switch 28 at the beginning of a rain and the resulting energization of the relay.

From the foregoing, it will also be apparent to those skilled in the art that the principles of the present invention may be employed to control the operation of systems other than sprinkling systems which require time control and rainfall responsive control. A typical system, for example, would be one employed to periodically open and close flood gates and to maintain such gates continuously open during periods of natural rainfall.

As a further example, the novel master control unit 12 described above may be employed to control the water level in a receptacle such as a swimming pool or water supply reservoir or the like (identified by reference character 136 in FIGURE 5) by detaching rain switch 28 from the master control unit and positioning it at a given level in the pool or other receptacle and connecting conduit 18 to the receptacle. By appropriate adjustment of timer 26, the system may be used to make up evaporation or other losses at the most convenient time with the rain switch automatically shutting off flow to the receptacle when the desired level is reached. This is particularly useful in the case of swimming pools in which evaporation losses can be made up at night when they are not in use and water demand is at a minimum.

In this application of the present invention, it may also be desirable to employ two rain switches 28 connected in parallel, one positioned in the receptacle and one as shown in FIGURE 2. This arrangement will operate in the manner just described and will also de-energize solenoid 30 to close valve 24 and prevent flow to the pool or other receptacle while rain is falling to prevent overfilling.

The control unit 12 described herein may also be employed to automatically pump down swimming pools, reservoirs, and the like by locating rain switch 28 in the receptacle to be pumped down and slightly modifying relay R56 so that the pump 124 will be energized when the rain switch is closed. In this type of application, pump 124 may be a regular swimming pool filter pump, for example. This may be accomplished by substituting a normally open contact 138 for contact 54 and connecting it by leads L128 and L134 to one side of the motor of pump 124.

Figure 5:
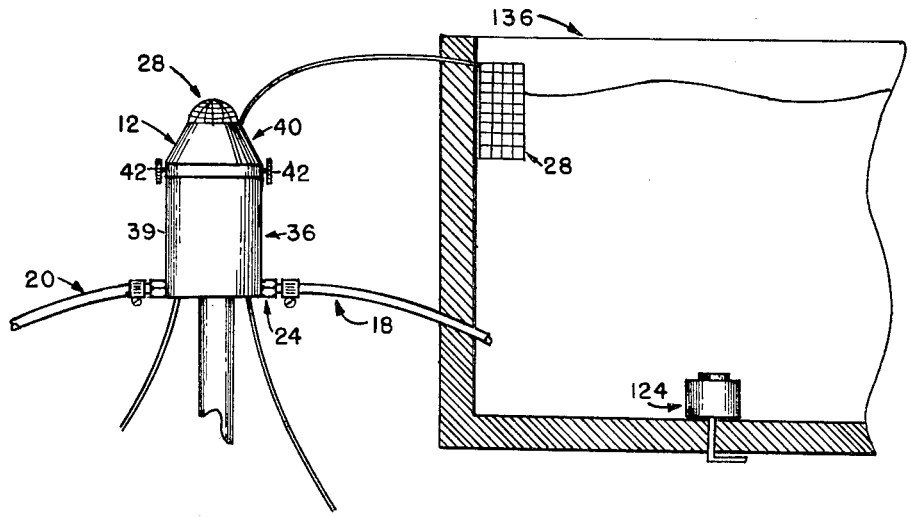
FIGURE 5 is a fragmentary elevation showing another embodiment of the present invention.
Figure 6:
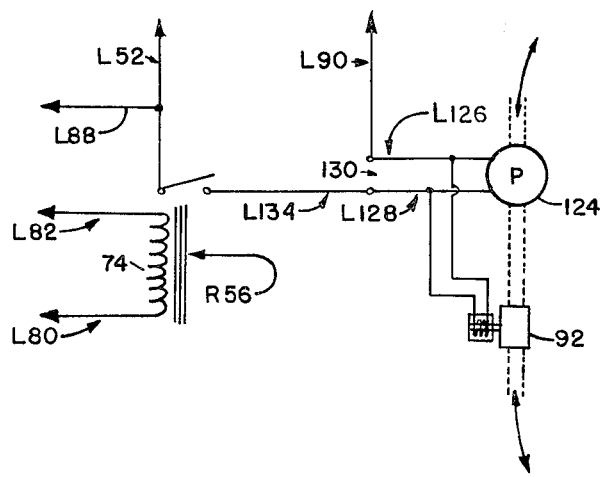
FIGURE 6 is a fragmentary schematic, showing a modification of the circuit of FIGURE 1.

In this version of the present invention, the components of the system may be located as shown in FIGURE 5 although it is not necessary that pump 124 be located in the receptacle or that control unit 12 be located as shown. Further, control unit 12 need not necessarily include a solenoid valve in this embodiment of the invention.

When timer switch 48 closes at the beginning of the preset period, the rain switch 28 in the receptacle will be submerged if the water level is too high; and relay R56 will be energized, closing normally open contact 138 to start pump 124. Pumping will continue until the water reaches the desired level, at which time the above-mentioned rain switch 28 will open, stopping the pump. By connecting two switches in parallel in the manner described above, pump 124 may also be automatically energized during periods of natural rainfall to prevent overflow.

As a final example of the versatility of the present invention, it will be apparent to those skilled in the art to which it pertains that, in applications of the type just described, rain switch(es) 28 may be replaced with switches responsive to pressure, humidity, and other parameters. Thus, this invention is adaptable to many applications requiring pumping and/or flow control regulated by time and an additional parameter.

What is claimed and desired to be secured by Letters Patent is:

1. A control system for a lawn sprinkling system or the like having a conduit with an electrically actuated flow control valve therein, comprising:

(a) a first circuit means for connecting the valve actuator to a source of operating voltage;

(b) timing means for automatically completing said first circuit means to energize the valve actuator and thereby open said valve and allow a flow of water through said conduit for a preselected period and for de-energizing said valve at the end of said period to close said valve by interrupting the continuity of said circuit means; and (c) means for overriding said timing means and effecting a closing of said valve while there is actual rainfall during said period beginning substantially with the start of said rainfall and for automatically restoring control of said valve to said timing means upon the cessation of the rainfall, said last mentioned means comprising:

(d) an electrically actuatable switch means having a contact in said first circuit means which is closed when said switch means is deactivated;

(e) a second circuit means adapted when completed to actuate said switch means and thereby effect an opening of said contact to interrupt the continuity of said first circuit means with a consequent closing of said valve despite the completion of the first circuit means effected by the timing means; and (f) a rain switch for controlling the continuity of said second circuit means comprising an insulating member having a surface which is adapted to be oriented to receive rain thereon and first and second spaced apart conductor means on said surface and connected into said circuit means which are adapted to be electrically connected by rain on said insulating surface and thereby complete the continuity in said second circuit means to actuate said switch means, thereby completing said first circuit means and effecting the closing of said valve, said insulating member being oriented to allow the rain to flow therefrom at substantially the same rate as it impinges on the member so that there is substantially no retention of water on said member after the cessation of rainfall, whereby the continuity of said second means is completed and interrupted to respectively effect a closing of said valve substantially conterminously with the starting of the rainfall and a restoration of the control of said valve to the control of said timing means substantially conterminously with the cessation of said rainfall.

2. A control system for a lawn sprinkling system or the like having a conduit with an electrically actuated flow control valve therein, comprising:

(a) a first circuit means for connecting the valve actuator to a source of operating voltage;

(b) timing means for automatically completing said first circuit means to energize the valve actuator and thereby open said valve and allow a flow of water through said conduit for a preselected period and for de-energizing said valve at the end of said period to close said valve by interrupting the continuity of said circuit means; and (c) means for overriding said timing means and effecting a closing of said valve while there is actual rainfall during said period beginning substantially with the start of said rainfall and for automatically restoring control of said valve to said timing means upon the cessation of the rainfall, said last mentioned means comprising:

(d) an electrically actuatable switch means having a contact in said first circuit means which is closed when said switch means is deactivated;

(e) a second circuit means adapted when completed to actuate said switch means and thereby effect an opening of said contact to interrupt the continuity of said first circuit means with a consequent closing of said valve despite the completing of the first circuit means effected by the timing means;

(f) a rain switch for controlling the continuity of said second circuit means comprising an insulating member having a surface which is adapted to be oriented to receive rain thereon and first and second spaced apart conductor means on said surface and connected into said circuit means which are adapted to be electrically connected by rain on said insulating surface and thereby complete the continuity in said second circuit means to actuate said switch means, thereby completing said first circuit means and effecting the closing of said valve;

(g) a casing housing said valve, said timing means, said electrically actuated switch means, and said first and second circuit means, said rain switch being fixed to the exterior of said casing; and (h) a perforate member incorporated in said rain switch overlying said insulating member to diffuse the rain falling thereon and to prevent inadvertent contact with said conductor means.

3. A control system for a lawn sprinkling system or the like having at least one conduit with an electrically actuated flow control valve therein, comprising:

(a) a source of A.C. voltage and circuit means for connecting said valve actuator to said voltage source;

(b) timing means for automatically completing the continuity of said circuit means to energize said actuator and thereby open said value and allow a flow of water through said conduit for a preselected period and for de-energizing said valve by interrupting continuity in said circuit means; and (c) means for overriding said timing means and effecting a closing of said valve while there is actual rainfall during said period and for automatically restoring control of said valve to said timing means substantially conterminously with the cessation of the rainfall, comprising:

a relay having a coil and a normally closed contact in said circuit means adapted to be opened by the energization of the relay to interrupt continuity in said circuit means and thereby effect a closing of said valve; a rain switch comprising an insulating member having a surface which is adapted to be oriented to receive rain thereon and first and second spaced apart conductor means on said surface adapted to be electrically connected by rain impinging on said surface, one of said contact means being connected to said relay coil; and a transformer having its secondary winding connected between said coil and the other of said rain switch contact means and its primary winding connected across said source of operating voltage, said transformer being a step-down transformer to limit the magnitude of operating voltage applied to and current flowing through said rain switch and thereby minimize shock hazards.

4. A control system for a lawn sprinkling system or the like having at least one conduit with a solenoid actuated flow control valve which is open when said solenoid is energized and closed when said solenoid is de-energized therein, comprising:

(a) a first circuit for connecting the coil of the valve actuating solenoid across a source of A.C. voltage;

(b) timing means for automatically completing the continuity of said first circuit to energize said solenoid and thereby open said valve and allow a flow of water through said conduit for a preselected period and for deenergizing said solenoid to close said valve at the end of said period by interrupting continuity in said first circuit, said timing means comprising a timer having a motor and a contact in said first circuit and operatively connected to the timer motor for opening and closing operation thereby together with a second circuit for connecting the timer motor across the source of A.C. voltages; and (c) means for overriding said timing means and effecting a closing of said valve by de-energizing said solenoid while there is actual rainfall during said period and for automatically restoring control of said valve to said timing means by de-energizing said solenoid substantially conterminously with the cessation of the rainfall, comprising:

a transformer having a primary and a secondary;

a third circuit for connecting said primary across said source of A.C. voltage through the contact of said timer, whereby said primary is energized only when said flow control valve is open;

a relay having a coil and a normally closed contact in said first circuit in series with said timer contact adapted to be opened by the energization of the relay to interrupt continuity in said first circuit and thereby de-energize the solenoid and effect a closing of said flow control valve;

a fourth circuit connecting said relay coil in series with said transformer secondary, whereby said coil is energized when said transformer is energized and there is continuity in said fourth circuit; and means for establishing continuity in said fourth circuit during times of actual rainfall and for otherwise maintaining said fourth circuit open comprising a rain switch including an insulating member having a surface which is adapted to be oriented horizontally to receive rain thereon and first and second spaced apart conductor means on said surface; said fourth circuit including leads connecting one of said conductor means to said relay coil and the other of said conductor means to said transformer secondary and thereby connecting said rain switch in series with said secondary and said coil, whereby said rain switch establishes continuity in said forth circuit to energize said coil and effect the closing of the flow control valve as long as there is sufficient rain water on said insulating member to provide electrical continuity between said first and second conductor means.

5. The control system of claim 4, together with at least one additional electrically operated device connected to said circuit means.

6. The system of claim 5, wherein:
(a) the sprinkling system has plural conduits with flow control valves therein; and
(b) the additional electrically operated devices are actuators for said valves.

7. The system of claim 5, wherein:
(a) the sprinkler system includes a booster pump; and
(b) the additional electrically operated device is the motor of said pump.

8. The system of claim 5, wherein the additional electrically operated device is a rain alarm.

References Cited

UNITED STATES PATENTS

| | | | |
|---|---|---|---|
| 1,285,986 | 11/1918 | Grafford | 200—61.05 XR |
| 2,751,915 | 6/1956 | Roberts | 239—304 XR |
| 3,212,714 | 10/1965 | Davis et al. | 239—63 |
| 3,118,606 | 1/1964 | Rotunda | 239—63 |

WILLIAM F. O'DEA, Primary Examiner

R. GERARD, Assistant Examiner

U.S. Cl. X.R.

137—393, 395, 624.15; 200—61.05; 239—63